(12) United States Patent
Smith

(10) Patent No.: US 10,644,328 B1
(45) Date of Patent: May 5, 2020

(54) SEAWATER ELECTROLYTE ELECTROCHEMICAL CELL

(71) Applicant: David Farnham Smith, Boulder Creek, CA (US)

(72) Inventor: David Farnham Smith, Boulder Creek, CA (US)

(73) Assignee: QYNERGY CORP., Albuquerque, NM (US)

( * ) Notice: Subject to any disclaimer, the term of this patent is extended or adjusted under 35 U.S.C. 154(b) by 0 days.

(21) Appl. No.: 15/530,631

(22) Filed: Feb. 9, 2017

(51) Int. Cl.
*H01M 6/34* (2006.01)

(52) U.S. Cl.
CPC ........................... *H01M 6/34* (2013.01)

(58) Field of Classification Search
CPC ........................................................ H01M 6/34
See application file for complete search history.

(56) References Cited

U.S. PATENT DOCUMENTS

| | | | |
|---|---|---|---|
| 3,177,099 A * | 4/1965 | Kirk | H01M 6/34 429/119 |
| 4,522,897 A | 6/1985 | Walsh | |
| 4,601,961 A | 7/1986 | McCartney | |
| 4,822,698 A | 4/1989 | Jackovitz et al. | |
| 5,225,291 A * | 7/1993 | Rao | H01M 6/26 429/118 |
| 5,256,501 A | 10/1993 | Hasvold et al. | |
| 5,405,717 A | 4/1995 | Hasvold | |
| 5,427,871 A | 6/1995 | Garshol et al. | |
| 9,130,225 B2 | 9/2015 | Sun et al. | |
| 2011/0269007 A1 * | 11/2011 | Visco | H01M 4/06 429/119 |
| 2012/0301751 A1 * | 11/2012 | Fertman | C01B 3/08 429/8 |
| 2013/0236763 A1 * | 9/2013 | Sun | H01M 6/34 429/119 |

FOREIGN PATENT DOCUMENTS

WO WO-8911165 A1 * 11/1989 .............. H01M 4/86

* cited by examiner

*Primary Examiner* — Sarah A. Slifka
*Assistant Examiner* — Lilia Nedialkova

(57) ABSTRACT

An improved seawater electrochemical cell with a consumable anode and an oxygen reducing cathode is provided with a reduced distance between anode and cathode surfaces. The reduced distance does not impede the ingress of oxygen dissolved in water and the egress of reaction products from the cell and causes an increase in the volumetric energy and power density of such dissolved oxygen seawater cells.

2 Claims, 4 Drawing Sheets

SEAWATER ELECTROLYTE ELECTROCHEMICAL CELL

FEDERALLY SPONSORED RESEARCH

This invention was made with government support under contract number N00014-16-C-2030 by the Office of Naval Research. The government has certain rights in this invention.

BACKGROUND—PRIOR ART

The following is a tabulation of some prior art that presently appears relevant:

| Pat. No.  | Kind Code | Issue Date    | Patentee        |
|-----------|-----------|---------------|-----------------|
| 5,256,501 |           | 1993 Oct. 26  | Hasvold et al.  |
| 5,405,717 |           | 1995 Apr. 11  | Hasvold         |
| 5,427,871 |           | 1995 Jun. 27  | Garshol et al.  |
| 4,822,698 |           | 1989 Apr. 18  | Jackovitz et al.|
| 9,130,225 | B2        | 2015 Sep. 08  | Sun et al.      |
| 4,522,897 |           | 1985 Jun. 11  | Walsh           |

NONPATENT LITERATURE DOCUMENTS

Hasvold, O., 34$^{th}$ International Power Sources Symposium (1990), "Seawater Batteries for Low Power, Long Term Applications"

Walsh, M. 34$^{th}$ International Power Sources Symposium (1990), "Single Cell Seawater Batteries".

Lauer et al, 34$^{th}$ International Power Sources Symposium (1990), "Seawater Activated Power Source for Long Term Missions".

Cells referred to as dissolved oxygen electrochemical cells have been used for several decades which are capable of delivering very high energy at low power. The cells are safe and low cost but have consistently suffered from a very low volumetric power density. Such cells operate by the anodic oxidation of magnesium, aluminum, or zinc and the cathodic reduction of oxygen which is dissolved in seawater or freshwater. The concentration of oxygen in water is low, typically 6-11 parts per million. When the electrodes are connected externally to a load, the electrons flow from the oxidizing anode metal to the cathode where the oxygen in solution is reduced by the electrochemical reaction $O_2+2H_2O+4e^-=4OH^-$. Copper and stainless steel are used alone or incorporated with catalysts as cathodes.

The ability of the cells to deliver useable power is determined largely by the cathodic oxygen reduction reaction, which is mass transport limited. Oxygen must be supplied to the cathode rapidly enough to support the electrical load and the reaction product hydroxyl ion OH— must be removed efficiently to avoid precipitation of calcium carbonate from calcium which is present in the water. Precipitation takes place if the OH$^-$ concentration is great enough for the chemical reaction $Ca^{+2}+HCO_3^-+OH^-=CaCO_3+H_2O$ to take place.

All of the prior art dissolved oxygen cells have structures that hold the anode and cathode many centimeters apart. The reasoning for the very wide open structures is based upon a desire to provide unimpeded ingress of dissolved oxygen to the cathode and effective egress of the reaction product which is the hydroxyl ion OH$^-$.

Unfortunately the very open mechanical structures are overly large in size, resulting in low volumetric power and energy density.

U.S. Pat. No. 5,405,717 ((Hasvold) describes an open cell structure of a circular cathode spaced apart from a rod shaped magnesium anode. The patent states that as a result of the low concentration of oxygen in seawater, oxygen reducing seawater cells must have a very open structure in order to allow sufficient flow of fresh seawater through the cathode. The patent does not divulge the exact distance between anode and cathode surfaces but the drawing figures clearly show a large distance.

U.S. Pat. No. 5,256,501 (Hasvold) describes a cell with a circular cathode array of perforated or expanded copper which is coiled in a spiral outside a magnesium alloy rod shaped anode. The patent does not specify the distance between cathode surfaces and the anode but the drawings clearly show the distance as multiple centimeters. In the patent description, it is stated "Additionally, the cell must have an open structure to allow free access of fresh seawater and to get rid of the reaction products formed."

In U.S. Pat. No. 5,427,871 (Garshol et al.), carbon, stainless steel, copper, silver, or titanium fibers are formed into a cathode structure similar to a bottle brush. The cathodes are spaced away from rod shaped magnesium anodes. In the patent description, it is stated "Additionally, the cell must have an open structure to allow free access of fresh seawater and to get rid of the reaction products formed."

U.S. Pat. No. 4,601,961 (McCartney) describes a seawater cell with a single magnesium anode, a single insulating film, and a single carbon cathode all in intimate contact. In such a design there is total access of the electrodes to the surrounding seawater.

In U.S. Pat. No. 4,822,698 (Jackovitz, et al.), the EXAMPLE describes a cell with a singular circular oxygen reduction cathode and multiple rod shaped magnesium alloy anodes where the distance between cathode and anode surfaces was 6.8 cm. Catalyzed carbon was used as the cathode surface.

U.S. Pat. No. 4,522,897 (Walsh) describes a cell with a rope-like structure where an anode of aluminum, magnesium, or zinc was used with a non-electron conductive separator between the anode and a close fitting cathode. In one embodiment the cathode consisted of woven catalyzed metal strands which function as a hydrogen emitting hydrogen emitting cathode. In such a cell the electrochemical reaction is the reduction of water which is $2H_2O+2e^-=H_2+2OH^-$. The cathodic reaction is not mass transport limited as is the case with the reduction of dissolved oxygen in water. Cells based upon the reduction of water suffer from very low cell voltage (~0.7V).

In another embodiment of U.S. Pat. No. 4,522,897, depolarizers are used as cathodes. The depolarizers claimed are manganese dioxide, lead chloride, silver chloride, cuprous/silver chloride, cuprous thiocyanate, or trichloromelamine. The reactions are not mass transport limited allowing the cell to function without a large spacing between the electrodes. While the cell voltage is comparable to that of dissolved oxygen cells, the faradaic capacity of the cathode is limited by the amount of depolarizer, which places a large limitation on the operational life of the cells. The faradaic capacity of the dissolved oxygen reduction cathode is unlimited because the concentration of oxygen in seawater is never totally depleted.

U.S. Pat. No. 9,130,225 (Sun, et al.) discloses an open structure of multiple flat plate magnesium alloy anodes and inert metal cathodes in a circular radial array with a large centrally located open area at the center. The distances between the plates is not specified but the drawing clearly indicates a distance in the order of several centimeters.

DETAILED DESCRIPTION

Our discovery teaches away from the prior art in that an open structure for dissolved oxygen cells is not desired and water flow through the cathodes is not required to avoid precipitation of calcium carbonate and to efficiently supply oxygen in solution to the cathodes of cells which operate by the reduction of oxygen in water. Contrary to the prior art teaching, we have found that a constricted design operates without excessive polarization, and precipitation of calcium from seawater does not take place provided that the discharge current density does not exceed 100 $\mu a/cm^2$ at low water velocity.

To demonstrate the ability of dissolved oxygen cells to operate efficiently with narrow distances between anode and cathode, a series of tests were performed on cells with a spacing of 0.75 cm between anode and cathode, each sized 5 cm×7.6 cm. Magnesium alloy AZ61 (6% aluminum and 1% Zn) was the anode and 40 mesh copper screen was the cathode. The cells were discharged for 120 hours at constant current in 32 PSU artificial seawater at 12.1° C. The concentration of dissolved oxygen was 7.1 ppm. Three (3) cells were tested at three (3) different current densities (25, 50, and 100 $\mu A/cm^2$) at an average linear velocity of the water was 4.27 cm/s. An additional group of three (3) cells were tested at identical current densities but at an average water linear velocity of 8.04 cm/s. The voltages are reported in TABLE 1 below.

TABLE 1

| Current Density ($\mu a/cm^2$) | Linear Flow Velocity (cm/s) | Average Voltage (V) | Voltage at 120 hrs (V) |
| --- | --- | --- | --- |
| 25 | 4.27 | 1.158 | 1.161 |
| 25 | 8.04 | 1.165 | 1.164 |
| 50 | 4.27 | 1.105 | 1.098 |
| 50 | 8.04 | 1.107 | 1.108 |
| 100 | 4.29 | 1.046 | 1.024 |
| 100 | 8.04 | 1.063 | 1.050 |

Had precipitation of calcium carbonate occurred the cell would have been heavily polarized after a few hours discharge. Additionally, there was no evidence of polarization caused by an inadequate supply of oxygen in solution to the oxygen reducing cathode.

Dissolved oxygen cells built in accordance with this disclosure have volumetric power and energy density far in excess of the prior art.

DRAWINGS—REFERENCE NUMERALS

Figure 1:
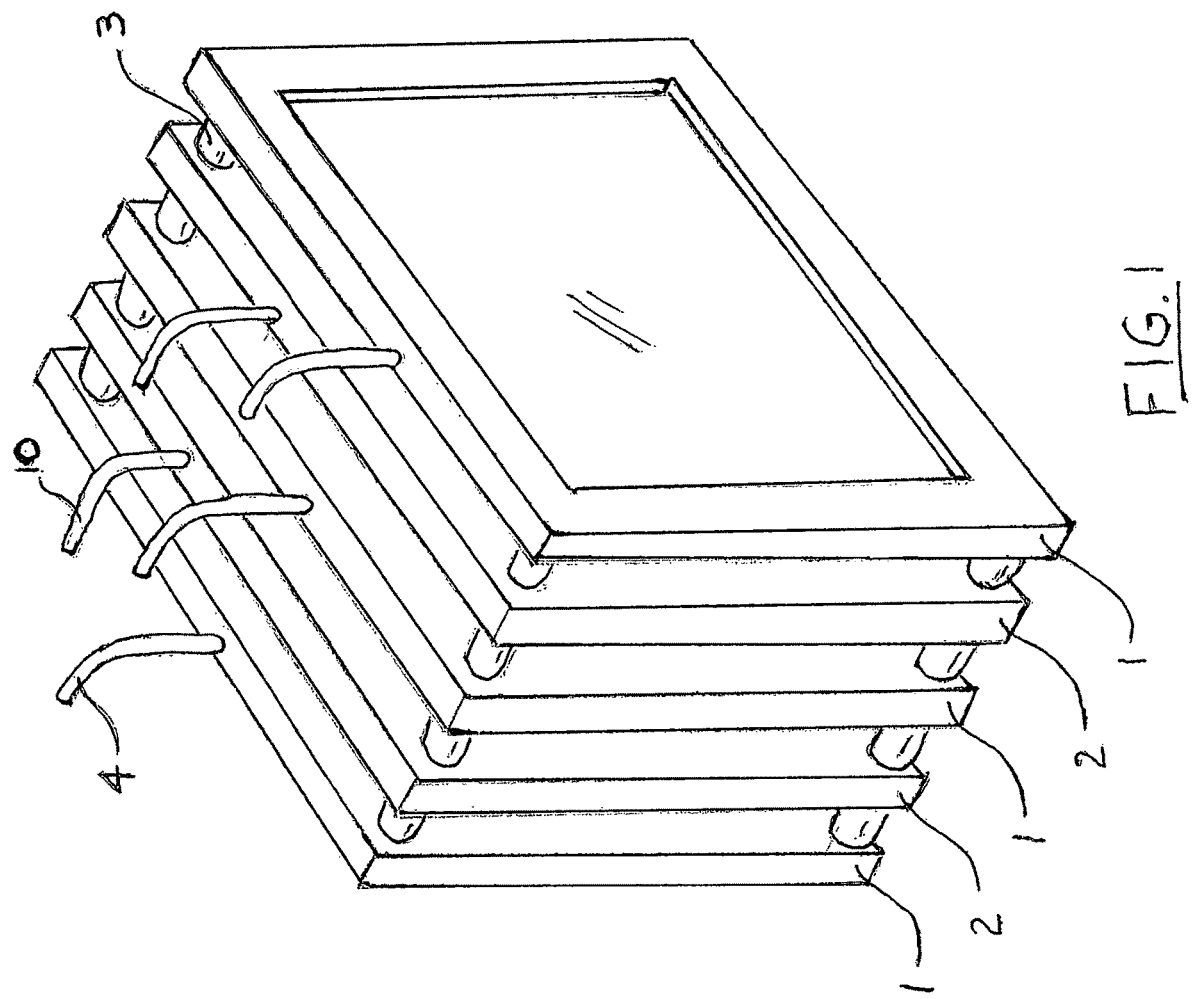
FIG. 1 is an overall view showing the assembly of anodes and cathodes, stacked and held apart by spacers.
Figure 2:
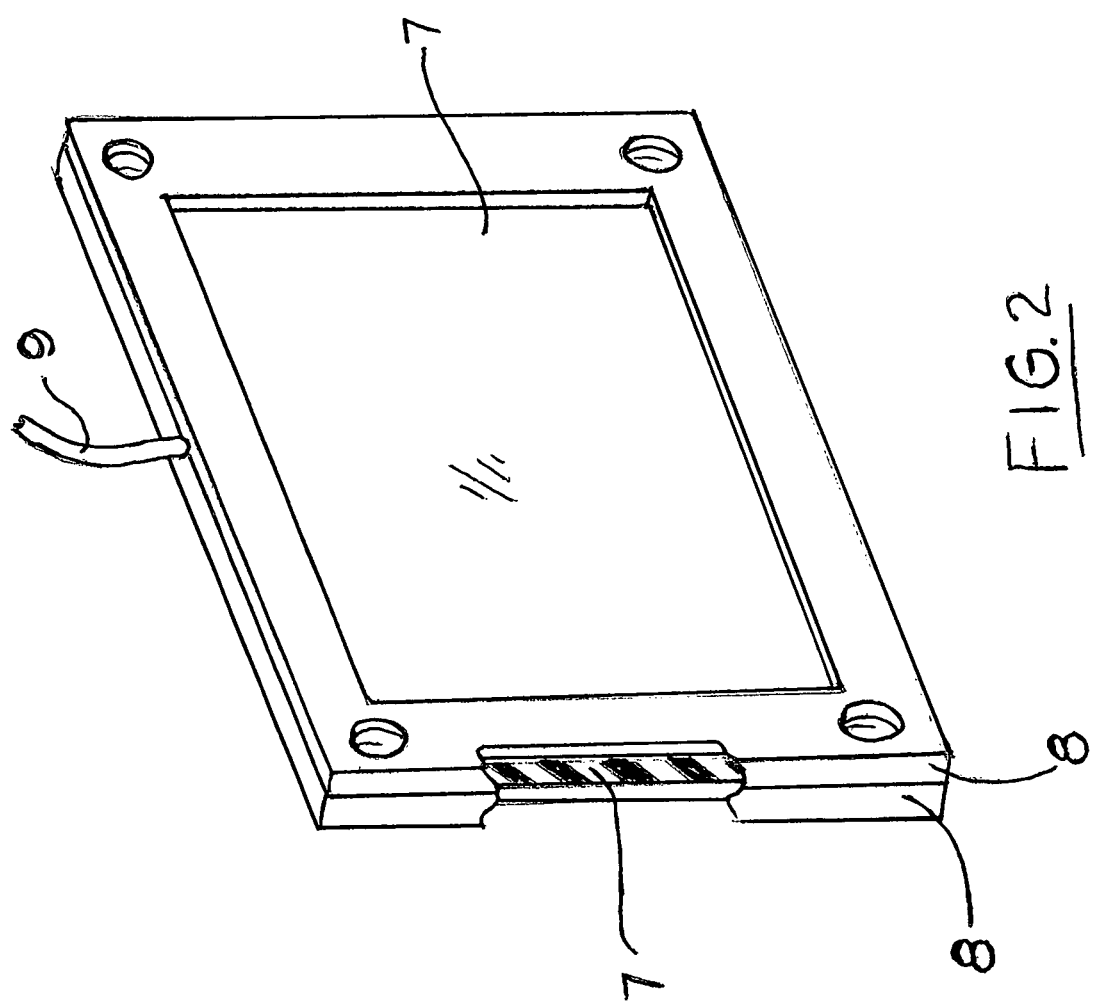
FIG. 2 shows the construction of an anode with plastic frame and lead wire.

1 Cathode Assembly
2 Anode Assembly
3 Spacer
4 Cathode Wire
5 Cathode Frame
6 Cathode Screen
7 Anode
8 Anode Frame
9 Anode Wire FIG. 1—First Embodiment The first embodiment dissolved oxygen cell is shown in FIG. 1. In FIG. 2 a sheet 7 of 0.78 mm thick magnesium alloy AZ61 (6% aluminum and 1% zinc) is cut to 15.2 cm×22.8 cm in size. Alternate thicknesses of anode metal can be used, depending upon the desired ampere-hour capacity. A lead wire 9 is connected to sheet 7. The connection is covered with epoxy resin. I contemplate that the epoxy be 3M two part epoxy 2216 (3M Corp, U.S.A.) but other materials compatible with seawater or freshwater are also suitable.

Anode electrode frames 8 were machined of polyvinylchloride (PVC) but other plastic, non-conductive such as but not limited to acrylonitrile butadiene styrene (ABS), and polyacetal may be used to advantage provided they are compatible with magnesium and seawater. The anode and wire assembly was held between two electrode frames 8 which are bonded together with any epoxy resin compatible with seawater and fresh water.

Figure 3:
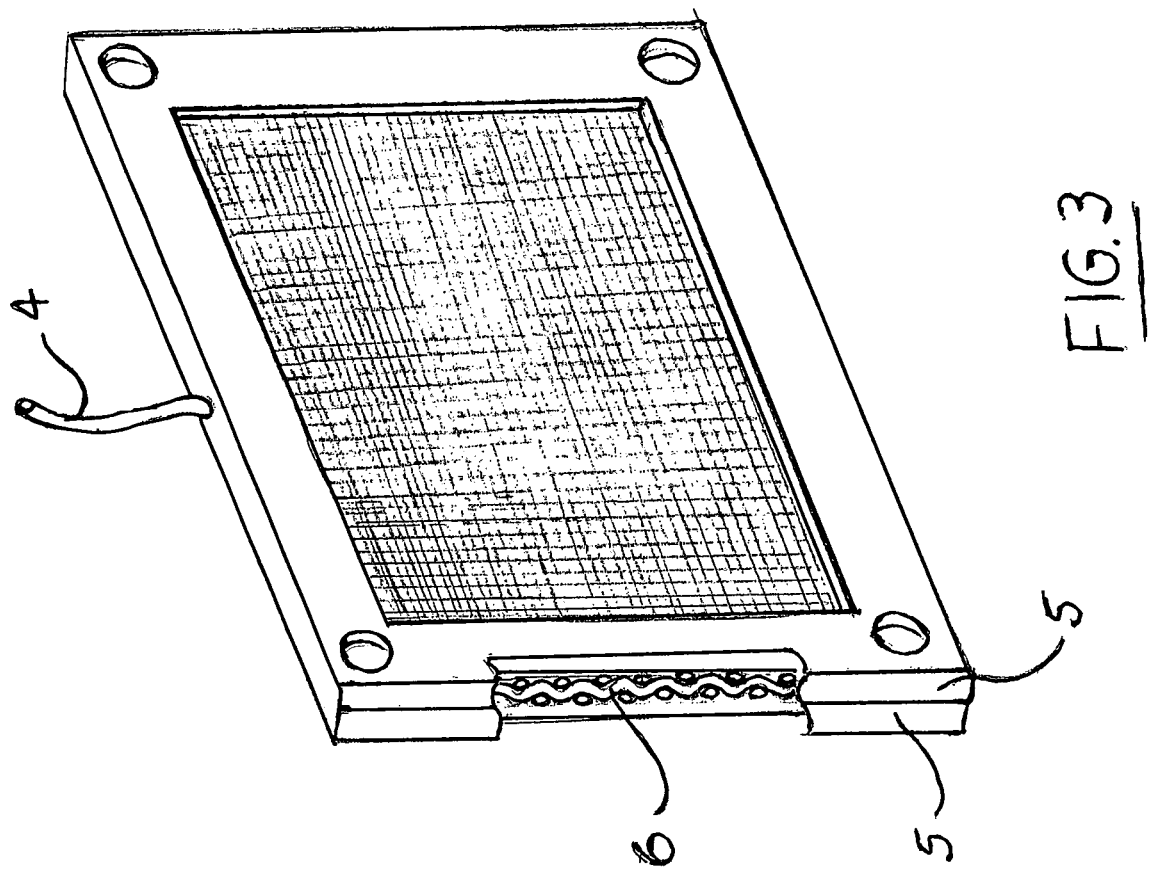
FIG. 3 shows the construction of a cathode with plastic frame and lead wire.

Referring to FIG. 3, a cathode 6 sized 15.2 cm×22.8 cm is cut from 40 mesh copper screen. Lead wire 4 is attached to the copper screen. The wire connection was covered with epoxy resin. The cathode assembly 1 was held between two electrode frames 5 which were bonded together with epoxy compatible with seawater and fresh water.

Referring to FIG. 1, electrode spacers 3 were machined from PVC tubing. The length of the spacers 3 determines the spacing between the anode surfaces and the cathode surfaces. I contemplate that the spacing between anode and cathode surfaces should be 0.3-0.8 cm but distances less than 0.2 cm are useable. The cell in FIG. 1 was assembled as follows: Two anode assemblies 2 and three cathode assemblies 1 are used.

A cell described in this embodiment was discharged at a current density of 50 $\mu a/cm^2$ in artificial seawater (29 PSU) at 5.9° C. at a flow velocity of 3.4 cm/s. In this embodiment the spacer length 3 was such that the spacing between each anode and cathode surface is 0.8 cm. The test results are presented in TABLE 2.

TABLE 2

| Elapsed Time (Hours) | Cell Voltage |
| --- | --- |
| 1 hour | 1.114 V |
| 4 hours | 1.106 V |
| 8 hours | 1.103 V |
| 12 hours | 1.101 V |
| 16 hours | 1.099 V |

Second Embodiment

A cell described in FIG. 1 was discharged at a current density of 50 $\mu a/cm^2$ in artificial seawater (45.4 ms/cm) at 6.0° C. at a flow velocity of 2.5 cm/s. In this embodiment the spacer length 3 was such that the spacing between each anode and cathode is 1.5 cm. The test results are presented in TABLE 3.

TABLE 2

| Elapsed Time (Hours) | Cell Voltage |
|---|---|
| 1 hour | 1.178 V |
| 4 hours | 1.085 V |
| 8 hours | 1.080 V |
| 10 hours | 1.079 V |
| 20 hours | 1.073 V |
| 30 hours | 1.068 V |
| 40 hours | 1.065 V |

At present I believe that dissolved oxygen cells with spacing between anode and cathode surfaces less than 2 cm operate most efficiently.

Third Embodiment

A cell described in FIG. 1 was placed in a natural marine environment at Monterey Calif. in a protected harbor. In this embodiment the spacer length 3 was such that the spacing between each anode and cathode is 0.8 cm. The cell was electrically discharged through a resistive load such that the average current density was equivalent to 43 μA/cm$^2$. The cell voltage over a 1290 hour discharge period is shown as FIG. 4.

Figure 4:
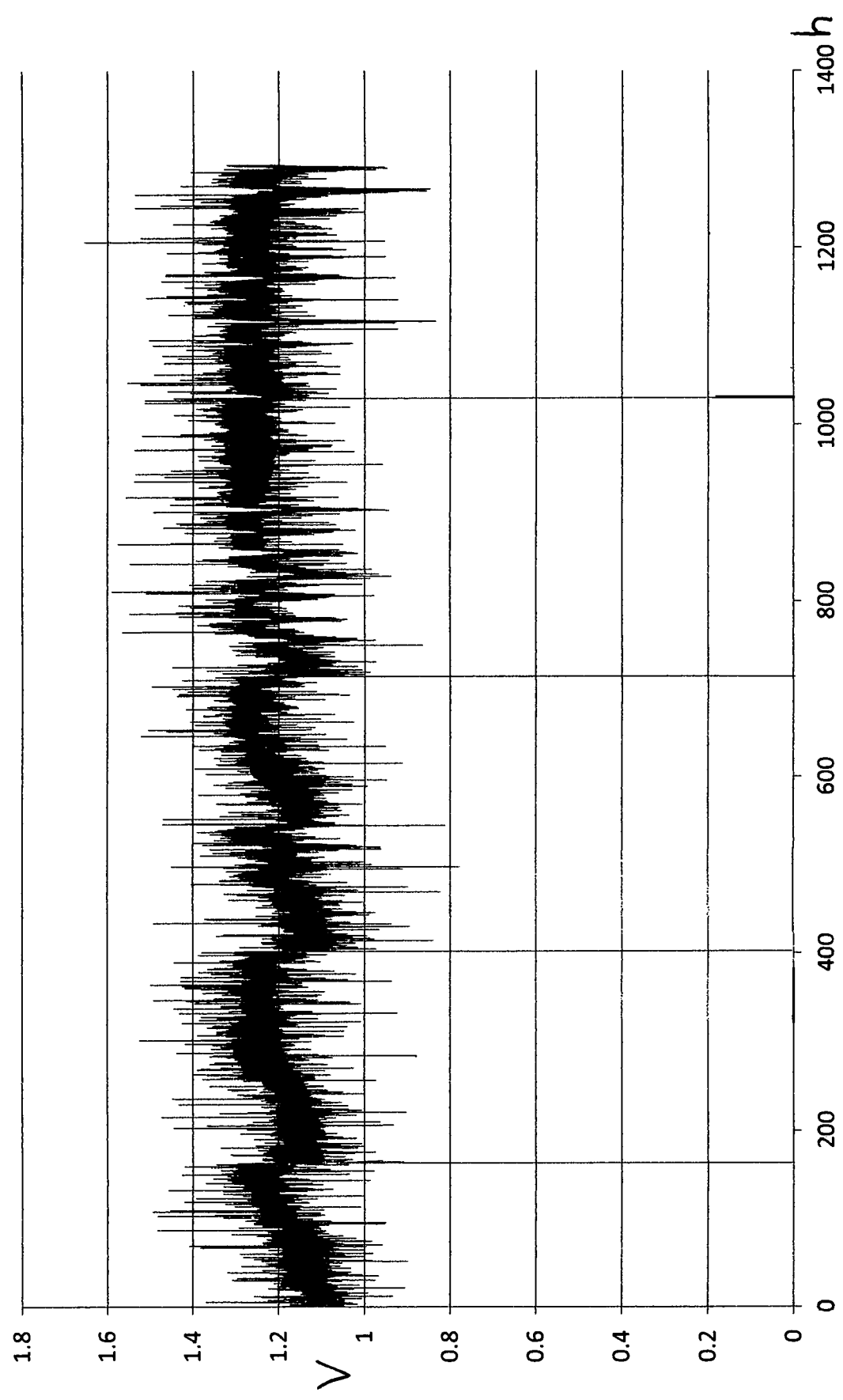
FIG. 4 shows the voltage of a dissolved oxygen cell with magnesium anodes and copper screen cathodes while the cell anodes and cathodes were connected together with a resistor in a natural marine environment. The y axis is the voltage of the cell and the x axis is elapsed time in hours.

During the discharge the water velocity ranged from 2 to 5 cm/s, the temperature ranged from 13.5 to 17° C., the dissolved oxygen concentration ranged from 4.5 to 7.0 ppm, and the salinity ranged from 33 to 33.3 PSU. Four (4) times during the discharge the cell was removed from the water for inspection. During those times the voltage approached zero volts, as shown in FIG. 4.

For the 1290 hour discharge period the average cell voltage was 1.2077V with a 1σ standard deviation of 0.0643V.

Alternate Embodiments

The shape of anodes and cathodes can be varied to accommodate different form factors such as but not limited to round and square. Expanded metal, woven, wool, and welded metals can be used as a cathode surface. Other cathode metals than copper can be used, including stainless steel and titanium. Other cathode screen mesh sizes can be also be used as well as solid foil and perforated foils.

Alternate anode metals are aluminum, zinc, and their alloys. Expanded metal configurations can also be used.

CONCLUSION, RAMIFICATION, AND SCOPE

The reader will see that the embodiments provide dissolved oxygen cells with greatly increased volumetric power density. Contrary to the prior art, a large spacing between anode and cathode is not needed or desired to properly supply dissolved oxygen to the oxygen reducing cathode and to remove the hydroxyl ions which can cause precipitation of calcium carbonate from the seawater or freshwater. I have found that a constricted design operates efficiently, resulting in significantly higher volumetric power density.

While the description of the embodiments contains specificities, these should not be construed as limitations on the scope, but rather as an exemplification of several embodiments thereof. Many other variations are possible such as shape of the electrodes and materials for the electrodes and the electrode frames. Accordingly, the scope should be determined not by the embodiments illustrated, but by the appended claims and other legal equivalents.

I claim:

1. A galvanic cell employing ambient seawater as electrolyte, the galvanic cell comprising:
    an oxidizing metal anode electrode selected from the group consisting of magnesium, aluminum, zinc, and mixtures thereof, and an oxygen reducing cathode electrode,
    wherein the electrodes are flat electrodes arranged parallel to each other such that all electrode surfaces do not contact each other and allow the seawater to flow between the electrodes, and all around the electrodes, such that all electrode surfaces come in contact with the seawater,
    wherein the electrodes are stacked atop one another to form an assembly and the electrodes are separated apart with spacing means, the spacing means holding the assembly together as a rigid structure open to ingress and egress of the seawater on all peripheral edges,
    wherein a thickness of the spacing means is such that the electrodes are at most 2.0 cm apart.

2. The galvanic cell of claim 1, wherein the assembly comprises multiples of the oxidizing metal anode electrode and multiples of the oxygen reducing cathode electrode,
    wherein all oxidizing metal anode electrodes are electrically connected together and all oxygen reducing cathode electrodes are electrically connected together.

* * * * *